(12) United States Patent
Bromley et al.

(10) Patent No.: US 8,862,536 B2
(45) Date of Patent: Oct. 14, 2014

(54) GRAPHICAL USER INTERFACE

(75) Inventors: Clifton Harold Bromley, Westminster (CA); Monte Leroy Fevang, Surrey (CA); Shafin A. Virji, Vancouver (CA)

(73) Assignee: Rockwell Software Inc., West Allis, WI (US)

( * ) Notice: Subject to any disclaimer, the term of this patent is extended or adjusted under 35 U.S.C. 154(b) by 357 days.

(21) Appl. No.: 13/051,472

(22) Filed: Mar. 18, 2011

(65) Prior Publication Data

US 2011/0166677 A1 Jul. 7, 2011

Related U.S. Application Data

(63) Continuation of application No. 10/670,582, filed on Sep. 25, 2003, now Pat. No. 7,925,611.

(51) Int. Cl.
*G06N 3/063* (2006.01)
*G05B 19/409* (2006.01)
*G06K 9/62* (2006.01)

(52) U.S. Cl.
CPC .... *G05B 19/409* (2013.01); *G05B 2219/35312* (2013.01); *G06K 9/6247* (2013.01); *G06N 3/063* (2013.01)
USPC .............................................. 706/60; 706/45

(58) Field of Classification Search
CPC .............................. G06N 3/063; G06K 9/6247
USPC ...................................................... 706/60, 45
See application file for complete search history.

(56) References Cited

U.S. PATENT DOCUMENTS

| | | | |
|---|---|---|---|
| 5,610,839 | A | 3/1997 | Karolak et al. |
| 5,801,691 | A | 9/1998 | Dahl |
| 6,199,136 | B1 | 3/2001 | Shteyn |
| 6,282,454 | B1 | 8/2001 | Papadopoulos et al. |
| 6,411,292 | B1 | 6/2002 | Cook et al. |
| 7,013,297 | B2 | 3/2006 | Miksovsky |
| 7,017,116 | B2 | 3/2006 | Elsbree et al. |
| 2002/0046221 | A1 | 4/2002 | Wallace et al. |
| 2002/0055984 | A1 | 5/2002 | Chang et al. |
| 2002/0070957 | A1 | 6/2002 | Trajkovic et al. |
| 2003/0070061 | A1 | 4/2003 | Wong et al. |
| 2003/0107588 | A1 | 6/2003 | Elsbree et al. |
| 2003/0120714 | A1 | 6/2003 | Wolff et al. |
| 2003/0174169 | A1 | 9/2003 | Tiwari |
| 2004/0056890 | A1 | 3/2004 | Hao et al. |
| 2004/0133853 | A1 | 7/2004 | Poerner et al. |
| 2004/0205185 | A1 | 10/2004 | Leonik |

OTHER PUBLICATIONS

Kostienko, et al., An Advanced Infrastructure for Collaborative Engineering in Electronic Design Automation, ISPE CE, A. A. Balkema Publishers, 2003, pp. 1-7.*

(Continued)

*Primary Examiner* — Wilbert L Starks
(74) *Attorney, Agent, or Firm* — Amin, Turocy & Watson, LLP

(57) ABSTRACT

The present invention relates to systems and methods that facilitates rendering of data in an industrial automation environment. According to an aspect of the invention, a device analyzer can determine properties associated with a plurality of devices intended for delivery of data. An HMI generator can format the data respectively in accordance with the determined properties of the devices and deliver the formatted data to the respective devices.

21 Claims, 11 Drawing Sheets

(56) References Cited

OTHER PUBLICATIONS

Traub, et al., An Object-Oriented Realtime Framework for Distributed Control Systems, Proceedings of the 1999 IEEE International Conference on Robotics & Automation, Detroit, Michigan, May 1999, pp. 3115-3121.*
Kostienko, et al., An Advanced Infrastructure for Collaborative Engineering in Electronic Design Automation, ISPE CE, A. A. Balkema Publishers, 2003, pp. 703-710.*
LaViola Jr., Whole-Hand and Speech Input in Virtual Environments, Brown University, Masters Thesis, 1999, pp. 1-137.*
OA dated Apr. 25, 2008 for U.S. Appl. No. 10/670,582, 15 pages.
OA dated Feb. 25, 2009 for U.S. Appl. No. 10/670,582, 13 pages.
OA dated Nov. 7, 2006 for U.S. Appl. No. 10/670,582, 28 pages.
OA dated Jun. 23, 2010 for U.S. Appl. No. 10/670,582, 14 pages.
OA dated Sep. 8, 2008 for U.S. Appl. No. 10/670,582, 24 pages.
Jeong-Dan Choi, Ki-Jong Byun, Byung-Tae Jang, Chi-Jeong Hwang "A Synchronization Method for Real Time Surround Display Using Clustered Systems", Dec. 1-6, 2002, 4 pages.
Gordon Stoll, Matthew Eldridge, Dan Patterson, Art Webb, Steven Berman, Richard Levy, Chris Caywood, Milton Taveira, Stephen Hunt and Pat Hanrahan,"Lightning-2: A High-Performance Display Subsystem for PC Clusters", Aug. 2001, 8 pages.
Thomas A. Funkhouser and Carlo H. Sequin, "Adaptive Display Algorithm for Interactive Frame Rates During Visualization of Complex Virtual Environments", 1993, 8 pages.
OA dated May 8, 2006 for U.S. Appl. No. 10/670,582, 26 pages.
OA dated Sep. 15, 2009 for U.S. Appl. No. 10/670,582, 10 pages.
OA dated Oct. 30, 2007 for U.S. Appl. No. 10/670,582, 29 pages.

* cited by examiner

GRAPHICAL USER INTERFACE

PRIORITY CLAIM

This application claims priority to U.S. patent application Ser. No. 10/670,582, filed on Sep. 25, 2003, entitled "GRAPHICAL USER INTERFACE." The entirety of the aforementioned application is incorporated by reference herein.

TECHNICAL FIELD

The present invention relates generally to industrial control systems, and more particularly to the communication and display of data in a graphical format that can facilitate the control and graphical representation of equipment obtained from a plurality of devices.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, ControlNet, DeviceNet, FOUNDATION Fieldbus, PROFIBUS or other network protocols and also communicate to higher level computing systems. Generally, industrial controllers utilize the aforementioned technologies along with other technology to control, cooperate and communicate across multiple and diverse applications.

Imperative to factory automation are human-machine interfaces (HMIs), which facilitate safe and efficient interaction between humans and machinery, wherein manipulation and control of complex and/or expensive machinery occurs via a computer. For example, in an industrial setting, a press operator can utilize a HMI to start and/or stop such press via depressing a key on a keyboard. Typically, HMIs operable on a computer include a graphical user interface (GUI) to facilitate display of virtual software objects that represent industrial system components and/or actions. For example, a GUI can allow display of a factory floor on a single display device, thereby enabling a user to quickly access a component on the factory floor via a graphical representation of such component. The graphical representations in turn have controls embedded, thus allowing a user to make real world changes through a visual representation.

Controls can be implemented to communicate with I/O of a physical device (e.g. a pump) via a server. Such an implementation is typically configured to allow a HMI to graphically display process points (I/O of physical devices) desirably controlled by a user. To control one or more process points, the user can select a graphical software object representing the one or more process points. Such exemplary control scheme utilizes a standard protocol to bring process points into an HMI environment and to communicate a value of each process point to an HMI.

An HMI also allows a user to log data taken on a periodic basis (e.g. trended data) to determine quality of process points relating to product manufacturing. For example, trending data can be desirable to facilitate efficient factory maintenance, quality control, and other similar operations. Furthermore, such trended data can be used to compare known ideal data with current data to ensure that a current system is operating properly. Therefore, a production automation system can "learn" from past data trends and utilize trended data to facilitate more efficient production.

Conventional HMI systems are associated with high implementation costs, as several platforms (e.g. devices and operating systems) are required by HMI(s) in accordance with a control scheme within an industrial setting. Disparate platforms are required in instances where control schemes vary with requirements for portability dictated by machine or factory layout. Programming costs increase with a number of platforms required, as dissimilar platforms require specific code (e.g., code facilitating display of graphical objects on a PDA differs from code facilitating display of graphical objects on a desktop monitor). Furthermore, a HMI created by a computer programmer can be inefficient when implemented within an industrial environment, resulting in increased cost due to system and/or process latency. In such instances, the programmers who created the HMI must be located to re-program such HMI into several disparate platforms, thereby compounding deficiencies of conventional HMIs (e.g., substantially similar HMIs on a PDA and computer monitor, respectively, require separate re-programming). In view of the foregoing, a system and/or methodology mitigating programming costs associated with substantially similar HMI(s) displayed on a variety of platforms is desirable.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention facilitates rendering of similar HMIs for a plurality of disparate platforms (e.g., computer monitor, PDA, palm pilot, cell phone, . . . ) via automatically generating code and/or data that is compatible with the plurality of platforms. For example, input from a physical device can be utilized to automatically render a substantially similar display (HMIs) on a plurality of disparate platforms (e.g., an HMI rendered on a stand alone PC will be presented in a highly rich format, while an HMI presented on a PDA with limited screen real estate and processing capability is displayed in a different format). Input required to render an HMI on a plurality of disparate display devices can be from one or more process points within an industrial system. For example, a system can include various components, wherein I/Os of the components is monitored and data obtained can be utilized to render an HMI. The present invention thus provides for numerous functionalities such as truncating various aspects of a rendered interface so as to make most efficient use of capabilities of a hardware device. For instance, an optimal HMI can be rendered utilizing the available hardware device.

One aspect of the invention relates to a view anywhere software that provides for a highly scalable HMI architecture. The view anywhere software enables graphical display of an entire factory floor, wherein an operator can navigate through factory hierarchy until a desirable level is reached. For example, a factory floor can include a plurality of selectable disparate systems, and the disparate systems can be associated with several components. A user can therefore view the factory floor and select a desirable system, thereby facilitating display of the system. Thereafter, a specific component within the system can be desirably selected, and a graphical representation of the component, as well as information relating to the component, can be relayed to a display device. This aspect of the present invention thereby provides for rendering of HMI in a manner coincident with capabilities of hardware employed with the rendering of data.

In accordance with one aspect of the present invention, software objects within a HMI that represent physical devices can be manipulated, thereby effectuating a desirable response from the physical devices. Software objects representing physical devices can be rendered in sufficient detail to display various intricacies associated with the physical devices. For example, a physical device can include a variety of mechanisms to manipulate operation, including push buttons, sliders, dials, gauges, etc. A software object representing the physical device can likewise include graphical representations of such mechanisms, wherein manipulation of the mechanisms in software can effectuate manipulation of the physical mechanisms.

In accordance with another aspect of the present invention, data can be delivered to a particular platform in optimal format (e.g., text, images, audio, . . . ). For example, intricate data can be optimally viewed as an image on a computer monitor, while the same data is best viewed textually on a PDA. Determination of a best format for conveying data can be facilitated by utilizing artificial intelligence techniques and/or via user selection. The invention can also employ AI-based functionality for inferring a best manner in which to render data given various state conditions and/or other extrinsic data and/or historical data and/or training of a classifier (explicit and implicit) to perform an inference. Furthermore, if a data type is initially unknown or data partially damaged, known and/or undamaged data can still be rendered.

The invention has other aspects such as for example, rich tag monitors, the ability to drill down within a rendered image (e.g., like map quest) to focus on specific target objects, presenting the same data in both 2D and 3D, providing for a change in 2D which updates the 3D counterpart in real-time and vice versa.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
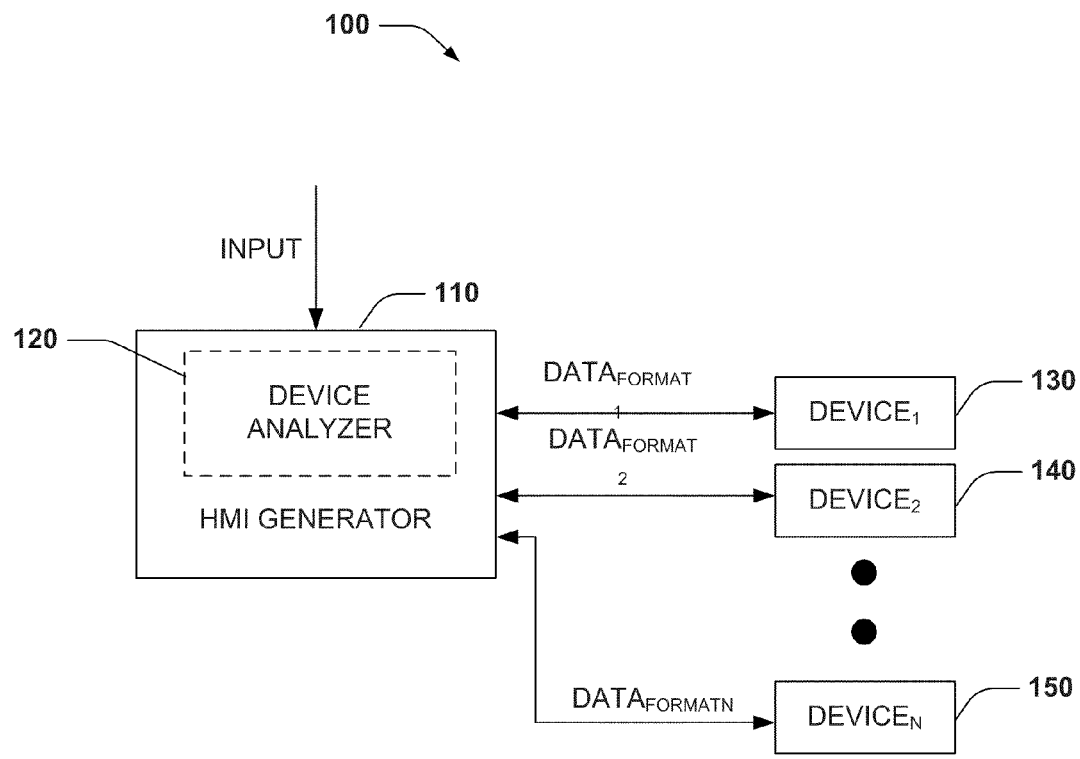
FIG. 1 is a block diagram illustrating an ability of an HMI platform to output data to a plurality of devices and display substantially similar characteristics of such data in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The present invention relates to a human machine interface (HMI) that facilitates rendering data in a platform (e.g. an operating system within a network) to display substantially similar data in disparate platform(s). The HMI can utilize a plurality of factors, such as disparate platforms running HMIs, display component size and/or resolution of a device receiving data, etc., to generate proper data format for a display device within an industrial setting. In addition, plug-and-play technologies can be utilized in connection with the present invention to facilitate automatic generation of properly formatted data in accordance with a particular electronic device (e.g., display device, storage device, relay device, . . . ). Based on known attributes of a platform and its capabilities, an HMI can be modified to accommodate a new setting in which data and/or code will be delivered. It is to be appreciated that any discussion herein pertaining to "data" or "code" or "data and/or code" is intended to encompass either "data" or "code," or both "data" and "code." Likewise, where the word "code" is used, "data" is also implied.

The present invention enables proper formatting of HMI data to be distributed throughout a network comprising a plurality of devices, wherein the devices require specific formatting to properly render the HMI data. Further, designing and creating in a single location provides for the HMI interface to be standard. For example, a template for the HMI can be stored on a central computer and utilized throughout the entire network. Thus, it should be appreciated that this aspect of the present invention reduces HMI control design and development.

Referring now to FIG. 1, a system 100 facilitating automatic generation of two or more HMIs on at least two disparate platforms is illustrated. The system 100 comprises an HMI generator 110 that can accept data from physical devices and deliver data (e.g., a HMI) to a plurality of disparate devices 130-150. The HMI can include software representations of physical devices, wherein manipulation of the software representations effectuates change of state in the physical devices. The devices 130-150 can be any device utilized for storing, displaying, and/or relaying data. For example, the device 130 can be a display, the device 140 can be a data store, and the device 150 can be a server. Furthermore, the devices can be disparate display devices, such as a desktop computer monitor, a PDA, cell phone display, industrial PC, hand-held PC, etc. The physical devices relaying data to the HMI generator 110 can include various components in an industrial environment, such as valves, pumps, relays, presses, etc.

The system 100 further comprises a device analyzer 120 that facilitates determining properties of the devices 130-150 to which data will be delivered via the HMI generator 110. Formatting and delivering the data to the devices 130-150 can occur automatically in accordance with particular compatibility requirements of the devices 130-150. For example, data delivered from physical device(s) can be formatted for a particular screen resolution while device 130 can be a display device utilizing a disparate screen resolution. The device analyzer 120 can make appropriate format changes to the data to accommodate the difference in resolutions. The HMI generator 110 can relay a variety of data formats to one or more devices 130-150, wherein the data delivered to the devices 130-150 is compatible with such devices 130-150. For example, device 130 can require two or more disparate formats to enable optimal HMI rendering.

The device analyzer 120 can be associated with a memory (not shown) and a processor (not shown). The memory of the device analyzer can be, for example, volatile memory and/or nonvolatile memory. For example, nonvolatile memory can include read only memory (ROM), programmable ROM (PROM), electrically programmable ROM (EPROM), electrically erasable ROM (EEPROM), and/or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The memory and the processor associated with the device analyzer 120 can be employed to store information regarding devices 130-150 to which data is delivered. Accordingly, devices 130-150 can be recognized and formatting requirements can be known upon an occurrence that the devices 130-150 are interfaced to a network. Therefore, the memory and processor allow the device analyzer 110 to accumulate and utilize data formatting requirements of the devices 130-150 employed in subsequent data transfers.

Artificial intelligence (AI) techniques can be utilized to determine formatting, thereby enabling data delivered to the devices 130-150 to be properly formatted. For example, the devices 130-150 can be disparate display devices (e.g., a desktop monitor, hand-held monitor, PDA, . . . ), and graphical representations desirably displayed can appear substantially similar on each display device. Furthermore, the AI techniques can be associated with a memory device in order to automatically facilitate data formatting requirements necessary for the transfer of data to a specific device. For example, if the device 130 has already been connected to and received data from the HMI generator 110, data formatting can be done automatically upon a subsequent occurrence that the device 130 is connected to the HMI generator 110.

Further, the device analyzer 120 can map data path information to data delivered to the device(s) 130-150. The data is representative of one or more process points from a physical device input into the HMI generator 110 located within a network. Typically, data paths to process points are stored when a software representation of the physical device is originally created in the HMI generator 110. However, when the HMI generator 110 is employed to relay properly formatted HMI data to the devices 130-150, and the properly formatted data is delivered to the display devices 130-150 located elsewhere in the network, there is inherently a different path to the process point(s) at the physical device. For example, if the properly formatted data is located at the HMI generator 110 in one location and data representing a process point has a location F:/Comp4/OPCServer/PLC5/001/GR150, the path to the process point location can vary after the data is transferred to the device 130 located at F:/PDA1/PocketOPCServer/PLC5/001/GR150. The mapping can facilitate changes in a data path to mitigate loss of data connectivity, thereby enabling proper communication between the data and the HMI.

Figure 2:
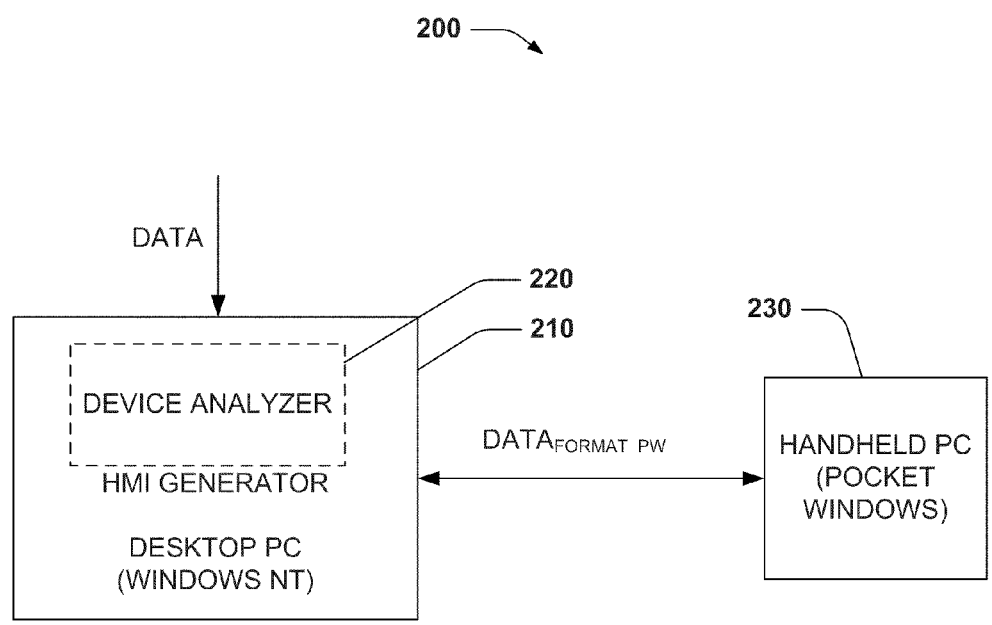
FIG. 2 is an exemplary platform of running an HMI in accordance with an aspect of the present invention.

Referring now to FIG. 2, an exemplary system 200 facilitating automatically generating and relaying properly formatted data to a particular operating system is illustrated. An HMI generator (desktop PC) 210 is utilized on a Windows NT platform and is representative of a location to design and create HMIs. A device analyzer 220 is utilized to format and deliver data to a display device (handheld PC) 230 in accordance with requirements of the display device 230 receiving the data from the HMI generator 210. In accordance with one aspect of the present invention, the data is delivered from a desktop PC 210 employing a Windows NT platform to a handheld PC 230 employing a Pocket Windows operating system.

The device analyzer 220 can be employed to format data delivered from the HMI generator 210 to the display device 230. Utilizing the device analyzer 220, formatting requirements for the display device 230 will be determined once the handheld PC 230 is coupled with the system 200 by contemplating a plurality of factors such as memory capacity, video capabilities, screen resolution and screen size of the device. After determining the formatting requirements for the handheld PC 230, data will be transferred from the desktop PC 210 with proper data format, thereby enabling the data on the handheld PC 230 to be displayed properly.

The handheld PC 230 can include several limitations requiring data formatting to be modified from the original state of the HMI generator 210 employed with a desktop PC. For example, a plurality of operating systems can be run on a plurality of handheld PCs. A handheld PC can run Pocket Windows, Palm OS or Linux OS platforms, wherein the platforms can have disparate formatting requirements for the data as it is input into the handheld PC. Furthermore, Microsoft Pocket Windows can run on a plurality of processor types such as MIPS, SH3 and ARM.

Another consideration is the amount of memory available to process the data from the HMI generator 210 on a handheld PC 230. The memory available in a desktop computer is defined in terms of hard drive space and RAM. A typical hard drive in a desktop PC can contain 50 gigabytes of storage and provide for 512 megabytes of RAM memory. In comparison, a handheld PC can be restricted to 32 megabytes of storage space and 64 megabytes of RAM. Memory limitations can limit the amount of HMI data stored on a device and also limit the amount of data that can be processed when running an HMI application. Furthermore, the processing capabilities on a handheld PC 230 will be much lower than that of a desktop PC 210. For example, the processing speed of a typical desktop PC utilizes a 2-gigahertz processor compared to a handheld PC's 400-megahertz processor.

Also, consideration of screen size, resolution and color capabilities of a handheld PC 230 compared to a desktop PC 210 is necessary to determine data formatting requirements. For example, a desktop PC 210 can have a screen size of 17 inches where a handheld PC 230 may have a screen size of 3.8 inches providing for size of all components displayed on a smaller scale in the handheld PC 230. Further, the screen resolution and color capability of the handheld PC 230 is more restrictive than the desktop PC 210. For example, a standard screen resolution of a monitor utilized with the desktop PC 210 can be 1024 by 768 pixels. By comparison, screen resolution of the handheld PC 230 can be 240 by 320 pixels. Accordingly, a different data format is required to accommodate the lower resolution to enable displaying graphics in a substantially similar manner regardless of the platform on which the HMI is displayed.

Furthermore, colors available in a handheld PC 230 may not allow for similar display of data as created on a desktop PC 210 unless the data is formatted properly. For example, the display on a handheld PC 230 may be capable of recognizing and displaying 16-bit depth and 64,000 colors compared to 64-bit depth and 16 million colors in a desktop PC 210. Therefore, data transferred from the desktop PC 210 can provide for a lower color bandwidth to deliver graphics to the handheld PC 230 facilitating proper display of data by the handheld PC 230.

Another consideration is the type of monitor utilized to display the software objects employed with the HMI. Two types of technologies relating to computer monitors include CRT (cathode ray tube) and LCD (liquid crystal display). A typical desktop PC 210 utilizes a CRT monitor which is brighter and has better screen resolution than a comparable LCD display found on a handheld PC 230. Furthermore, the viewing angle of an LCD display is lower than a CRT display. For example, an LCD display can allow for 100 degrees of viewing angle where a CRT monitor can provide for almost 180 degrees of viewing angle from the front of the monitor.

Differences between the desktop PC 210 and the handheld PC 230 can necessitate different data formatting requirements based on screen resolutions, color capabilities, memory and processor speeds. The present invention advantageously solves the problem created by differences in computer processing speed and display requirements by formatting data required by the handheld PC 230. For example, a 3-dimensional software object created on a desktop PC 210 with a CRT monitor may be converted to a 2-dimensional object when data is delivered to a handheld PC 230 with a small LCD monitor. To further this example, a user can design an HMI based on an assumption that the HMI will run on a particular device, such as a desktop PC with a CRT display. While the HMI runs on the desktop PC, it may not run correctly on a device with limited memory, display capability, etc., such as the handheld PC described above. The HMI generator 210 can recognize the limitations of the less capable device and morph the HMI application to run in a manner suitable to the limitations of the smaller and/or less capable device.

Figure 3:
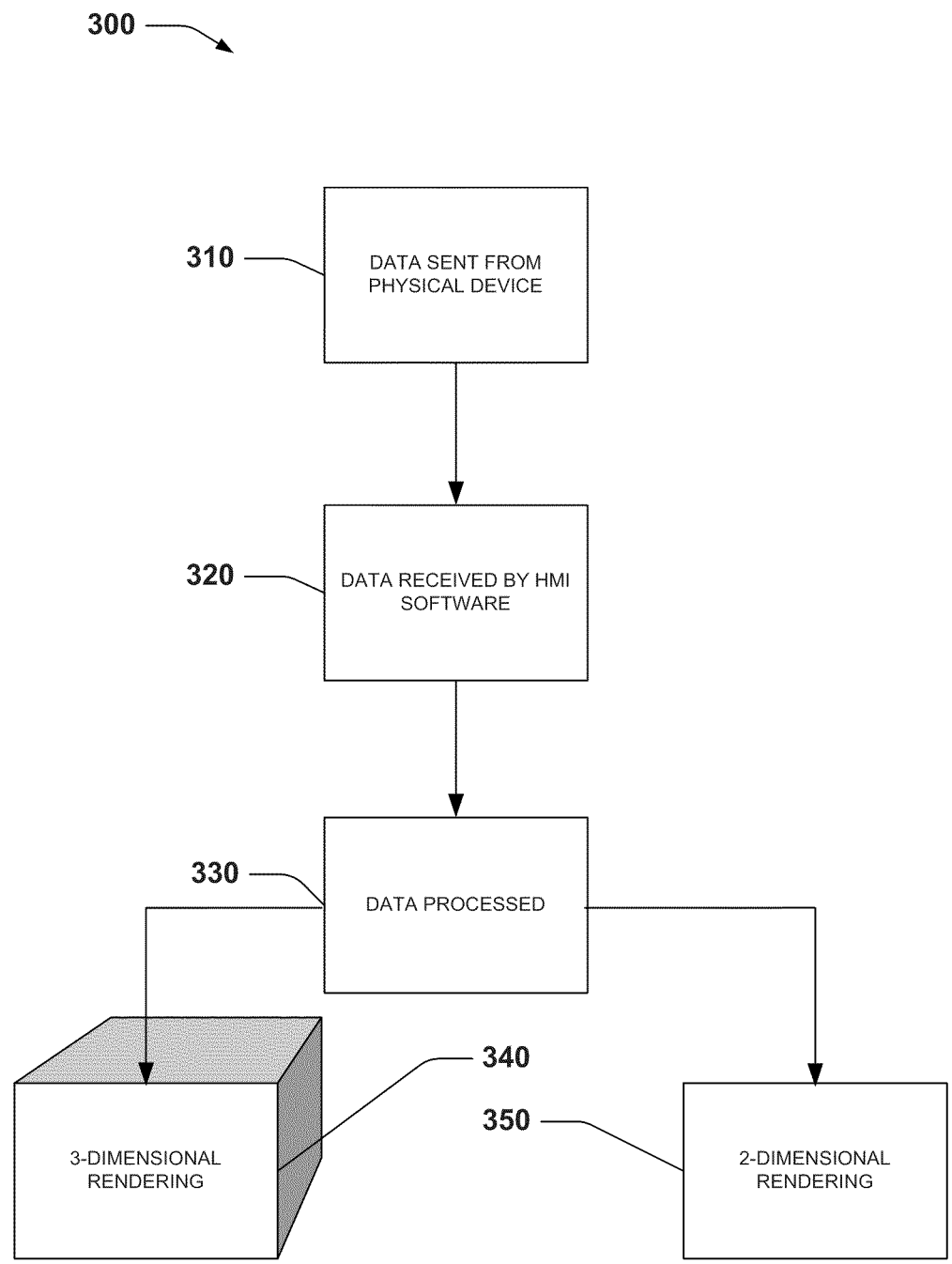
FIG. 3 is a flow diagram illustrating a methodology for adjusting graphics in accordance with an aspect of the present invention.

Referring now to FIG. 3, a method 300 illustrates processing and rendering data in both two and three-dimensional renderings at substantially the same time. Initially, data is sent from a physical device 310 which is received by an HMI 320. Algorithms associated with the HMI are employed to process the data 330 into a two-dimensional 340 and/or three-dimensional 350 software object based on a user selection. Two-dimensional rendering enables data to be displayed utilizing a two-axis methodology. The rendering of the data is correlated to process point values and allows for variance of a two-dimensional object in a plurality of attributes such as size, color variance, etc. Furthermore, the data set utilized to display a three-dimensional software object can be associated with process point values in the same manner.

The HMI contains an algorithm or algorithms to process data and provide data sets displaying values corresponding to values of process points associated with physical devices. The algorithm is utilized to process the data sent and provide data sets displaying values corresponding to values of process points associated with physical devices. A user may choose the appropriate algorithm or algorithms to properly render a software object to an HMI.

Figure 4:
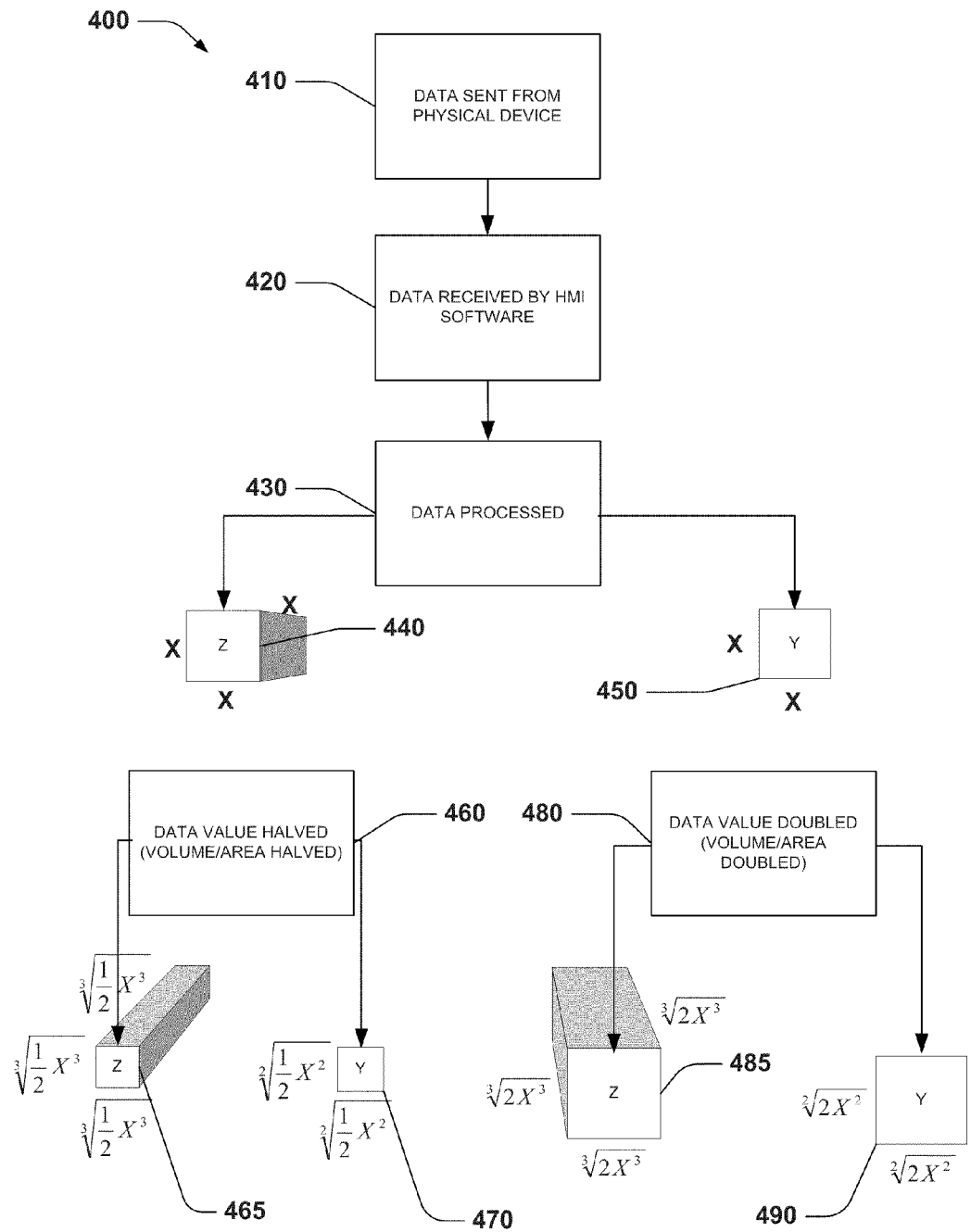
FIG. 4 is a block diagram illustrating exemplary modifications to a data set in accordance with an aspect of the present invention.

Turning now to FIG. 4, a methodology 400 is shown utilized to modify aspects of software objects in 2-dimensions describing the same process points as software objects displayed in 3-dimensions. Data is sent from a physical device 410 and received by an HMI generator 420. The data is processed 430 and changes in the value of data will be reflected at substantially the same time in both a 2-dimensional HMI software object 450 and a 3-dimensional HMI software object 440 reflecting a corresponding change in value of the process point.

Changes in the data values can be displayed differently in a 2-dimensional HMI software object than the data change in a 3-dimensional HMI object. For example a 2-D rectangle can be associated to a process point (e.g. I/O from a physical device) in a plurality of ways. A change in the data value can be displayed as a change in only the height of the rectangle or alternatively can be shown as a change to both the height and width of the rectangle. Similarly, a 3-dimensional rectangle can associate process points that adjust the height, width or length individually or all three dimensions at substantially the same time.

The user may select specific changes made to software objects associated with process point value changes. For example, the area of a 2-dimensional square can be associated so that it will double in area when the value of a corresponding process point doubles in value. Similarly, the volume of a 3-dimensional cube can be assigned so that it will double in volume when the value of a corresponding process point doubles in value.

For example, a process point can be associated to the square by a user so a linear relationship exists between the value of the process point and the area of the square. Therefore, if the initial area of a square is 1 unit$^2$, when the value of the process point value doubles, the process point associated with the area of the square will be 2 unit$^2$ and the length and width will 1.41421 units. Comparatively, the volume of a cube can be associated with a process point so that a linear relationship exists between the value of the process point and the volume of the cube. Therefore, a cube with an initial value of 1 unit$^3$ can double when the process point value doubles creating a software object where the volume of the cube will be 2 unit$^3$ and the length, width and height will be 1.25599 units.

The difference in the relationship of a process point associated with a square and a cube can be demonstrated by using another example extrapolating the values so the process point value increases by 16 times. The following equations demonstrate the difference required in 2 and 3 dimensional objects necessary to vary the size of the software object.

Square—width×height

Original value—1 unit$^2$=1 unit×1 unit

Process point doubles—2 unit$^2$=1.41421 units× 1.41421 units

Cube—width×height×length

Original value—1 unit$^3$=1 unit×1 unit×1 unit

Process point doubles—2 unit$^3$=1.2599 units×1.2599 units×1.2599 units

There is a difference of 0.15431 or 7.7% of each corresponding side to double the value between the 2-D area and 3-D volume.

Square—width×height

Original value—1 unit$^2$=1 unit×1 unit

Process point(×16)—16 unit$^2$=4 units×4 units

Cube—width×height×length

Original value—1 unit$^3$=1 unit×1 unit×1 unit

Process point(×16)—16 unit$^3$=2.5198 units×2.5198 units×2.5198 units

There is a difference of 1.4802 or 9.25% of the (×16) value between the 2-D and 3-D rendering.

It should be appreciated that the value of the volume of the cube is increased in a greater proportion to the area of square when the value of a process point doubles. That is to say, in order to affect a greater change in the volume of a cube requires a lower change in the dimension of each side. This disparity becomes more apparent as the value of the process point increases.

Also, it should be appreciated that the values relating to an example of rendering the data in two and three dimensions can be quantified as values derived from geometric equations. After the data is sent from the physical device 410, received by the HMI software 420 and the data is processed 430 the data can be rendered in substantially the same time as a 2-dimensional 450 and 3-dimensional object 440. In this example, the data is rendered as both a 2-dimensional square and a 3-dimensional cube. After the data is changed from its initial value, a formula can be utilized to express the size of the software objects in their proper proportional sizes.

In a software object that is a 2-dimensional square, Y denotes an initial value of a process point and initial area associated with the square. The value of each side of the square can be expressed as an equation:

Square:

$$\text{Area—each side can be } X, \therefore Y = X^2$$

$$\text{If } Y \text{ is doubled, each side can be expressed as: } \sqrt{2X^2}$$

$$\text{If } Y \text{ is halved, each side can be expressed as: } \sqrt{(\tfrac{1}{2})*X^2}$$

In a software object that is a 3-dimensional square, Z denotes an initial value of a process point and initial volume associated with the square. The value of each side of the cube can be expressed as an equation:

Cube:

$$\text{Volume—each side can be } X, \therefore Z = X^3$$

$$\text{If } Z \text{ is doubled, each side can be expressed as: } \sqrt[3]{2X^3}$$

$$\text{If } Z \text{ is halved, each side can be expressed as: } \sqrt[3]{(\tfrac{1}{2})X^3}$$

Figure 5:
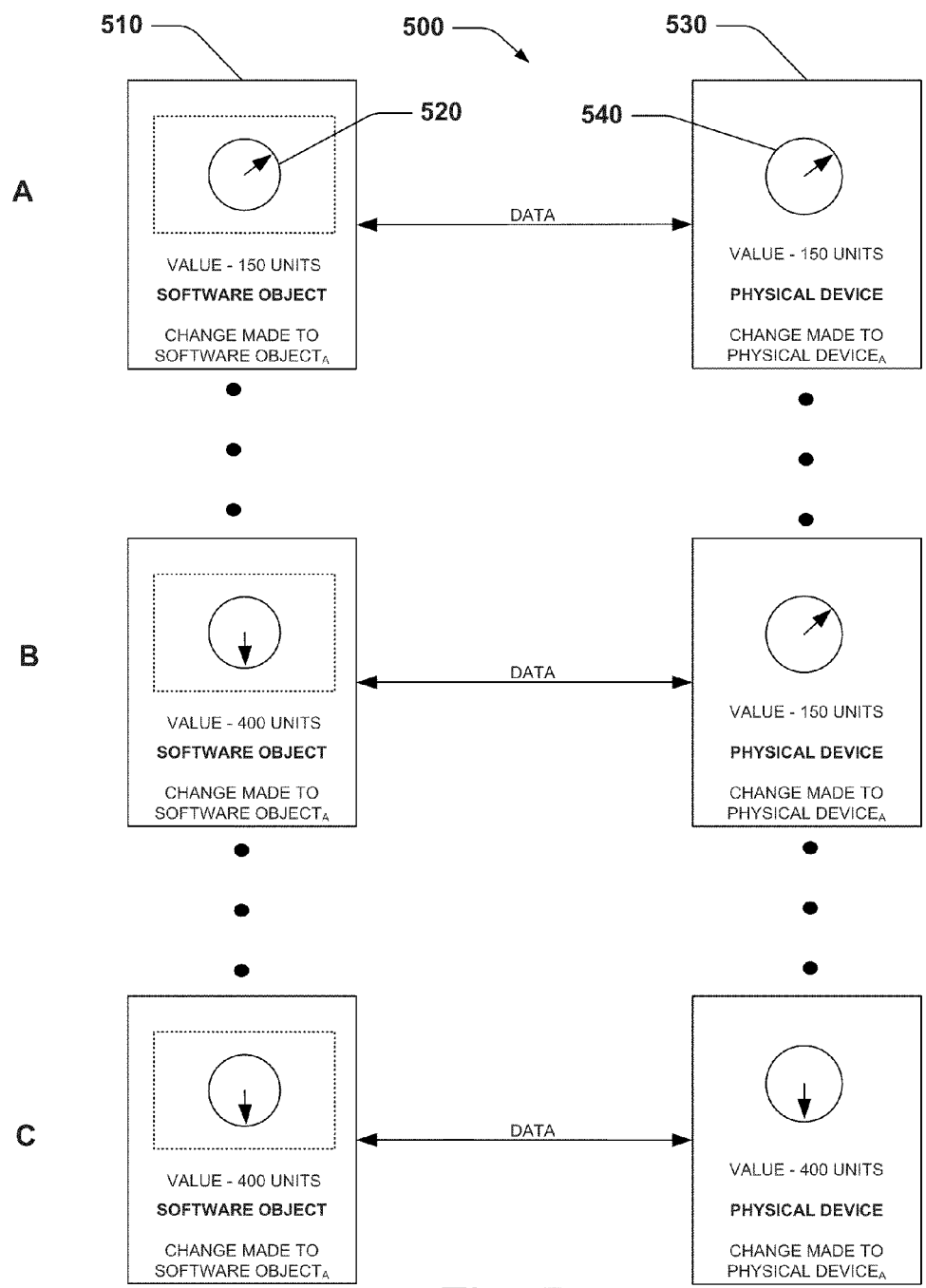
FIG. 5 is a block diagram illustrating an exemplary system employed to manipulate software objects in accordance with an aspect of the present invention.

Referring now to FIG. 5, illustrating an exemplary system employed to manipulate software objects capable of changing data values of process points associated with physical devices by changing data values associated with software objects representing physical devices. A user can utilize an appropriate control associated with the software object and adjust the control to affect the change to the desired process point. The modification to the control can come from a plurality of software objects including sliders, push buttons, dials, and gauges. Controlling a physical device utilizing a software object representing the device, requires a process point associated with the physical device to be connected to the software object via an HMI.

The software object can be created using a plurality of methods such as an physical object representation imported as a .bmp, .jpg or .dxf file or the like to utilize pre-fabricated art in the HMI. Also, an object can be selected from a plurality of objects contained in a library within the HMI or simply created by the user using drawing tools and saving the object within the HMI environment.

The software object can be connected to the physical device by way of selecting a process point from a nested data structure representing the process points available in the control architecture. The nested data structure can represent the path to the process point on the factory floor from the computer where the HMI generator resides. Further, multiple process points can be selected and associated with a single software object to allow communication between the software object and the process points. The process points can be utilized to modify a plurality of attributes associated with the software object including color, size, shape and location on the screen. For example, a two-dimensional square software object can have two process points associated with it. The first process point can be utilized to vary the area of the square corresponding to a change in the first process point value. A second process point can be used to vary the location of the software object corresponding to a change in the second process point value.

Once the software object is created and process points are associated with the software object, an object is capable of outputting values to the physical device and also capable of accepting input values from the physical device. The system 500 shows a software object capable of controlling and varying a process point associated with a physical device. The software object 520 contained within the HMI 510 can be created and associated to a process point associated with a physical device as described above. Data represents the connectivity between the software object and physical device found on the factory floor.

Stage A shows a software object 510 and an associated physical device 530 depicting an initial value 150 units of a physical device process point.

Stage B illustrates a change in the value of the process point via the software object 520 which can be changed by a user from 150 units to 400 units. However, the change in value 520 made to the software object has not yet been transferred to the physical device 540 due to a delay caused by processing. This delay is inherent in electrical control systems, and can be composed of a processing time in the software and/or hardware of the device, a data transfer time and a processing time in the software and/or hardware of the physical device. Therefore, the changed value of a process point in the HMI generator 510 is unchanged in the physical component 540 and remains at the initial value of 150 units.

Stage C shows the value of the process point in the software object 520 in the HMI 510 having the value transferred from the HMI 510 to the physical device 540. The data value is updated in the physical device 530 and reflects the change value of the process point made from the software object 510 to the physical device 530.

Further, it should be appreciated that the data can flow in two directions both from the HMI to the physical device and from the physical device to the HMI. Therefore, the above illustration represents only one instance of data transfer. The data value can also be transferred from the physical device 540 to the software object 520. In this scenario, the value of the process point would be first changed in the physical device 530. The means to facilitate such change would occur from a pushbutton, dial indicator, or some other input apparatus connected to the physical device. The system would also provide for an alternative system of data transfer whereby the data would first be changed in the physical device then later reflected in the software object as data that is changed. Therefore the data transfer is shown as a bi-directional flow since either the software object or the physical device can first provide a change in the process point that will later be reflected by the physical device or software object respectively.

Figure 6:
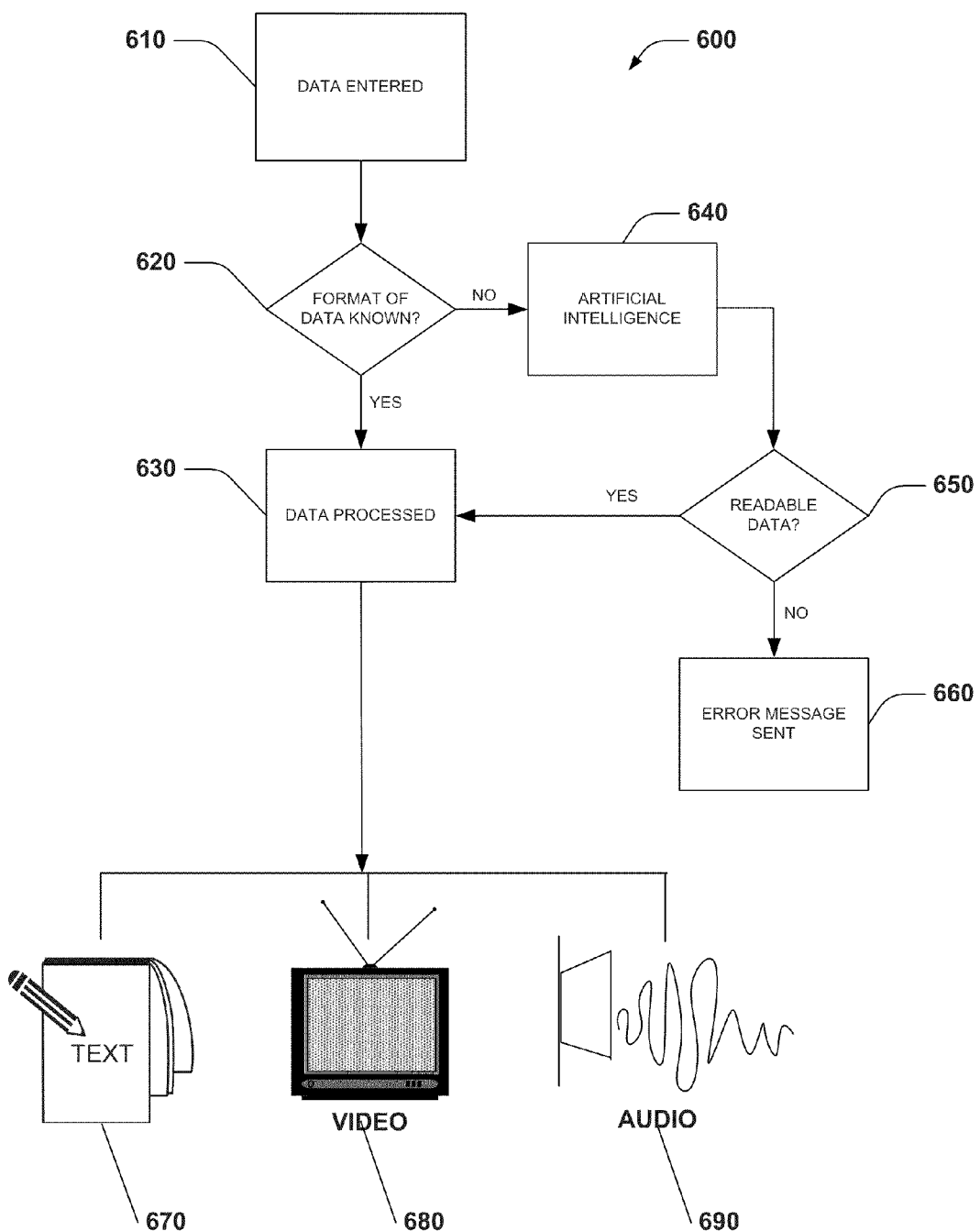
FIG. 6 is a block diagram illustrating output of data to a display in accordance with an aspect of the present invention.

Referring now to FIG. 6, showing a methodology 600 for determining data format and rendering data in a proper format. Initially, the data is entered into the HMI 610 and the format of the data is queried 620. For example, one method of determining format of the data is to compare the data to known formats until one is found that is matching. If the data introduced matches a known data format then the data will be processed 630 and rendered as at least one of text 670, video 680 or audio 690. (It is to be appreciated that, although rendered data is described herein as text, video, and/or audio, the present invention contemplates rendering data in any suitable format, including but not limited to static images, interactive images, etc.) For example, text can include written instruction such as specific pages from a user manual or a written value representing a process point. Similarly, video rendering can include video instruction to an HMI user or can illustrate a process function that is currently taking place. Audio formatting can refer to a sound signifying a certain condition within the system, or can be an audible instruction to the user to take action. Additionally, the present invention can employ text-to-speech capabilities whereby, for example, values of process points can be spoken to a user in a language of the user's choice (e.g., "The fluid temperature in mixing vessel number three is one hundred eighty degrees Celsius.").

Furthermore, this aspect of the invention provides for determining sub-formats of data, which can include, but are not limited to, ANSI, UNICODE, fonts, 3-D text, mp3, .wav, jpeg, mpeg, etc. For example, a particular device may be capable of an audio file in .wav format but not in mp3 format. The present invention can recognize a device's rendering limitations with respect to, for example, graphical, video, audio, textual, etc. sub-formats and modify the data and/or code generated to be suitably rendered on the device. In a similar manner, the present system can determine, for example, scripting languages (e.g., Java-script, Visual Basic for Applications, etc.), plug-ins (e.g., ActiveX controls, Ole Objects, etc.) etc., associated with and/or supported by a particular device and modify data and/or code accordingly to provide a "best fit" for the device.

If the format of the data type is unknown, artificial intelligence (A/I) 640 is employed to determine a proper format in which to render the data. The A/I can render the data in a variety of ways until a proper format is identified and then format and render the data properly. If the A/I determines that none of the data introduced can be read 650, the data is not processed and an error message is sent 660 to the HMI. The error message may be transmitted in a plurality of formats. For example, the error message may be transmitted by having the data value appear as a series of grayed out asterisks on the HMI display. However, if the A/I determines that some data can be read 650, the data will be processed 630 and rendered 670-690 within the HMI as described above.

Thus, A/I can be utilized to render data in a suitable format if data format is unknown. Further, A/I can render a portion of data if substantially all the data cannot be rendered and allow the readable data to be sent to the HMI environment. For example, if data is introduced with partially defective or unreadable information, data that is undamaged can still be located and rendered.

Further, the A/I 640 can have associated with it a memory (not shown) that will allow unknown data types to be stored and utilized if they are introduced. The memory will store the type of data format and the known method of rendering the data allowing the data to be rendered by the HMI properly. Therefore, the memory will allow for a more efficient method of rendering data properly when an unknown type of data is introduced.

Figure 7:
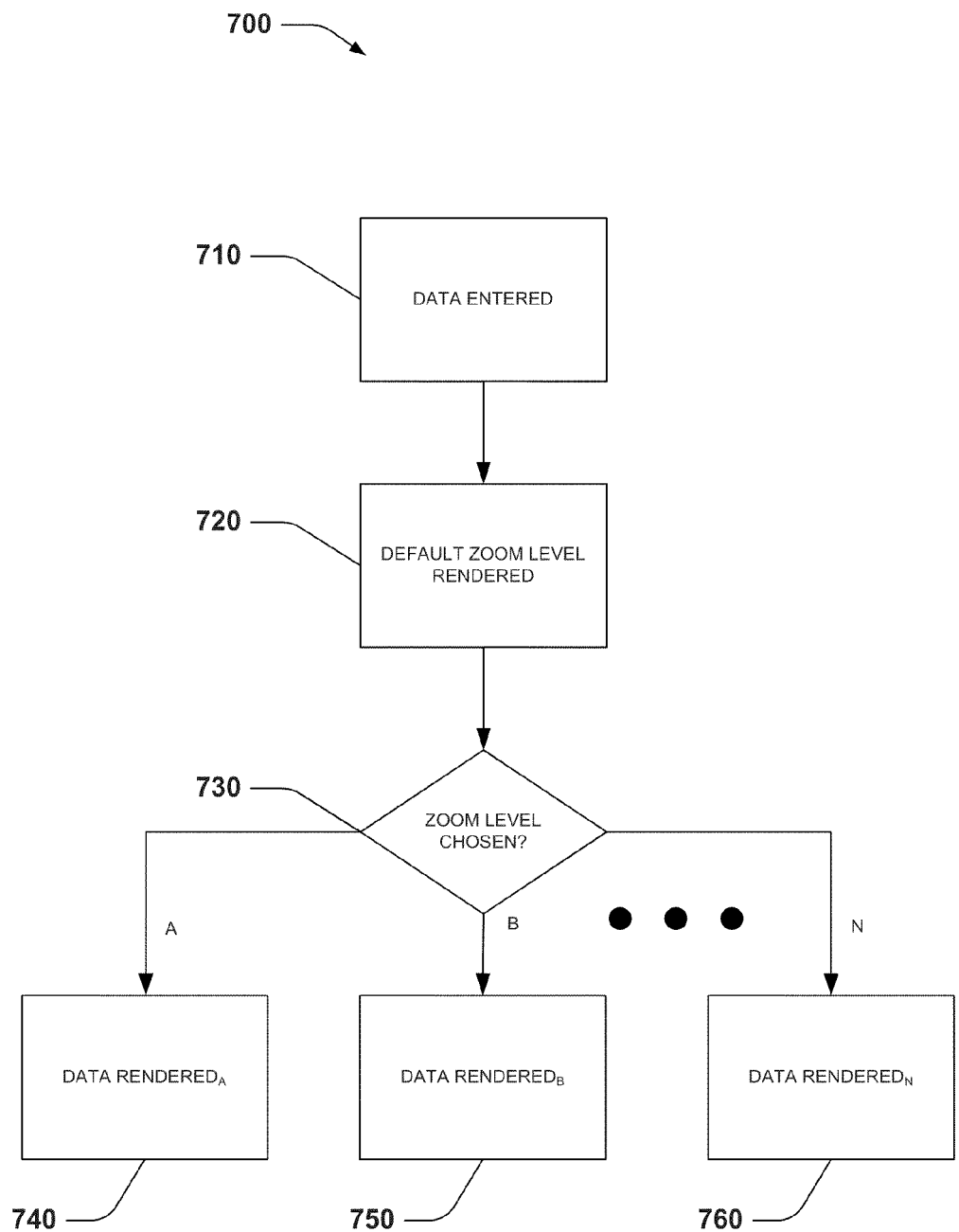
FIG. 7 is a flow diagram for relaying data to a display in relation to a zoom level in accordance with an aspect of the present invention.

Referring now to FIG. 7, a methodology 700 illustrates cluttering or de-cluttering data in a display associated with a zoom level chosen in an HMI. The zoom level relates to a plurality of disparate views associated with a display coupled with an HMI wherein data associated with process points can be hidden or exposed to the user. Further, it should be appreciated that the zoom level and the data exposed does not necessarily represent a linear relationship whereby the greater the zoom level, the greater amount of process point values are exposed. The process points can be associated with substantially any level of zoom and allow the data to be displayed in whatever fashion the user desires. Artificial intelligence (not shown) can be utilized to infer a default zoom level based on past zoom levels chosen by a user.

Initially, data is entered into the HMI 710 and rendered based on a default zoom level 720. After a user chooses a zoom level 730 data is rendered 740-760 based on the assigned zoom level chosen by the user. This methodology is beneficial in a display wherein a plurality of process points exist that do not require exposure to the user at substantially the same time. Some HMI displays inherently require data to be exposed as the user "drills down" into each display. For example, an initial screen in an HMI can show an entire plant floor which does not necessitate exposing the value of every process point when viewing an initial screen. However, as the user selects disparate zoom levels associated with for example each specific production line and each physical device associated with the line, the values of each process point can be exposed to the user. The zoom level and associated data can be assigned in order to facilitate rendering of data when a certain zoom level is selected.

Figure 8:
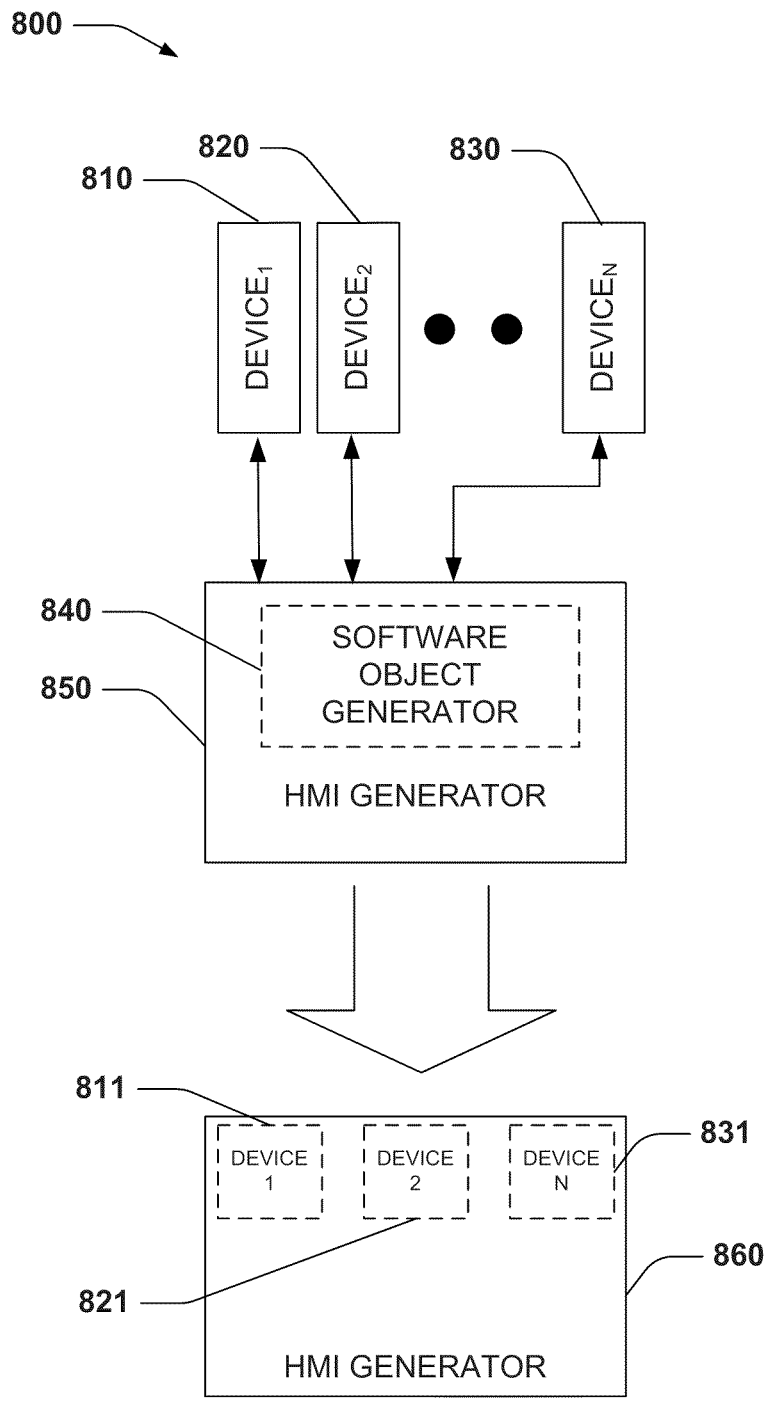
FIG. 8 is a block diagram illustrating automatically generating software objects in accordance with an aspect of the present invention.

Turning now to FIG. 8, a system 800 illustrates software object generator (g) 840 capable of creating software objects 811, 821, 831 in an HMI after physical devices 810, 820, 830 are connected to the HMI. Further, the SOG is associated with artificial intelligence (A/I) techniques (not shown) providing means for recognizing a physical device, providing for a software object representing the physical device and providing a software object in an HMI. The software object provides for substantially similar I/O as the physical device with the I/O connectivity already in place. Further, the software object 811, 821, 831 will have substantially similar graphical representation relating to the physical device 810, 820, 830 providing for an intuitive user interface to the physical device.

The SOG 840 is associated with an HMI generator 850 utilized to create interfaces to physical devices 810, 820, 830. Initially, a physical device 810 can be interfaced to the HMI generator 850 through a plurality of means including an interface to a control network to facilitate a recognition process. Interfacing to the HMI generator allows a polling process to initiate wherein the protocol required to communicate with the device is first utilized in order to determine a family of products a physical device is associated with. The SOG is enabled to facilitate communication to a database containing a plurality of software objects representing the physical devices. From the polling conducted and results regarding the communication of the physical device and I/O of the physical device, a comparison is made to the software objects associated with the database.

Furthermore, the SOG 840 is associated with an AI component (not shown) which facilitates recognizing a new physical device added to the system. The AI component will monitor the system on a periodic basis to ensure that substantially all the devices connected to the system are represented and available as a software object. After the AI component recognizes the newly added physical device 810, the component is created and added to an HMI library and made available to a user. Also, the HMI will recognize substantially all the components connected to the system so that upon initial startup for the HMI, the physical devices connected to the HMI will be available as software objects and ready for use in the HMI.

By allowing physical devices to be recognized by the HMI and available to the user, the programming of the system becomes more efficient. The user is not required to re-create software objects utilized from project to project that involve substantially the same physical devices. The user can simply choose the object from a library and implement the object in the current project as well as future projects that utilize the same or similar physical devices.

Further, the SOG 840 provides for paths to the process points on the physical devices to the software object that allows the user to make changes to the process points (I/O) related to each physical device. The paths associated with each process point are automatically associated with the software object and allow for connectivity to the appropriate physical device I/O. In this manner, the user is able to click, drag and drop the software object into an HMI and almost immediately begin to affect changes to the physical device associated with such object.

The path to the respective I/O is determined from a data server and how the data server receives its information. The data server is polled and the path to the data is found as a function of the network protocol employed and the location of the physical device. For example if an OPC server were utilized to bring the tags into the HMI, the first query would relate to the type of OPC server being utilized. Next, the system would poll the network containing the physical devices and determine what IP addresses were assigned to each component. For example, if the OPC server were employed to communicate to Ethernet, substantially all IP addresses associated with each physical device would be determined and compiled in the HMI. Afterward, the IP addresses and location of each device would be referenced together to determine what device existed at that address. The software object associated with the device is then employed to control the physical device when implemented.

Further, the software object created will provide the same I/O as the physical device. For example, if a device contains 12 digital inputs, 5 digital outputs, 3 analog outputs and 2 analog inputs, the software object would contain the same I/O. Also, the proper I/O would be assigned to the proper register on the PLC or other programmable machine control device that interfaced to the physical device before the I/O was networked with the rest of the plant.

Figure 9:
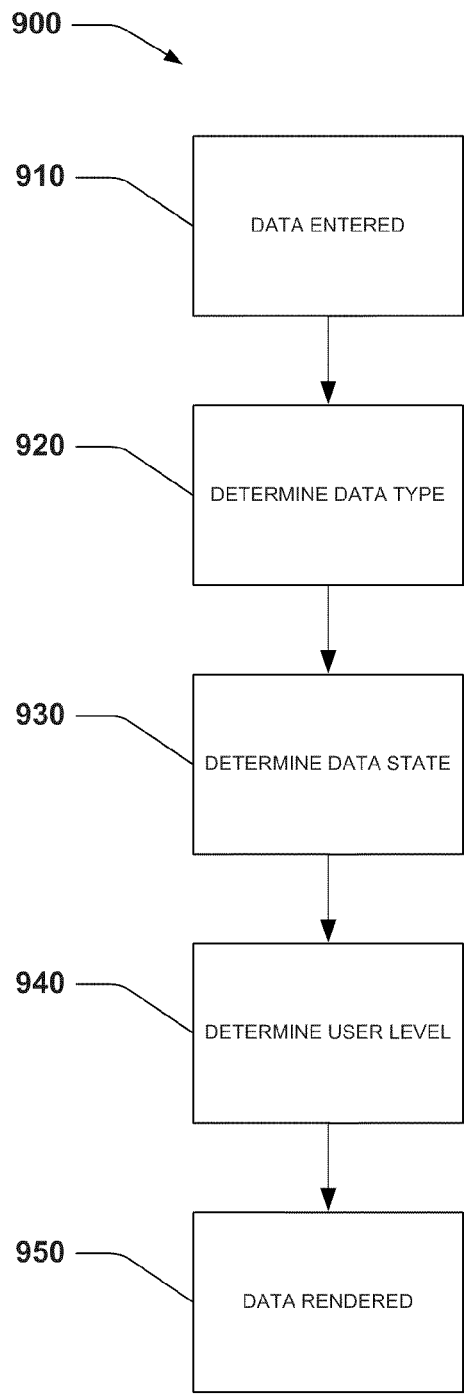
FIG. 9 illustrates a methodology for rendering data based on a plurality of factors in accordance with an aspect of the present invention.

Referring now to FIG. 9, representing a methodology 900 to determine how data is rendered in an HMI based on a plurality of factors. First, the data is entered 910 into an HMI through a data server and the data type is determined 920. The data type refers to the format of the data and whether the data is best rendered as for example text, audio or visually. For example, if the data were in .wav format, a method to render the data would be in an audio format.

Next, the state of the data is determined 930 to help decide how the data will be rendered. Logically gating I/O from the data can be accomplished utilizing a ladder logic interface (not shown) enabled to control the attributes of software controls. For example, if the data is higher than a pre-determined set point, the font selected for the data displayed can be red and boldfaced. However, if the data falls below the pre-determined set point, it can be displayed in a font with blue color and no boldface. Other attributes to the software objects can be changed accordingly. Logic parameters can be incorporated and saved and associated with a software object and saved in an associated memory (not shown) to utilize in the future.

Furthermore, a user level is determined 940 to find what type of access a user will have to the data. The data can be made inaccessible in a number of ways to either prevent the user from making any changes to the process point or to have the process point completely hidden from the user. For example, if the user does not have the proper access level they may view the data but are unable to make any changes to the data. Similarly, if the user does not have the proper access level, some data points can be hidden from the user completely. Therefore, taking into account all the above parameters, data is rendered 950 and can be exposed, hidden or disabled corresponding to such as user access level, data state or data type.

Figure 10:
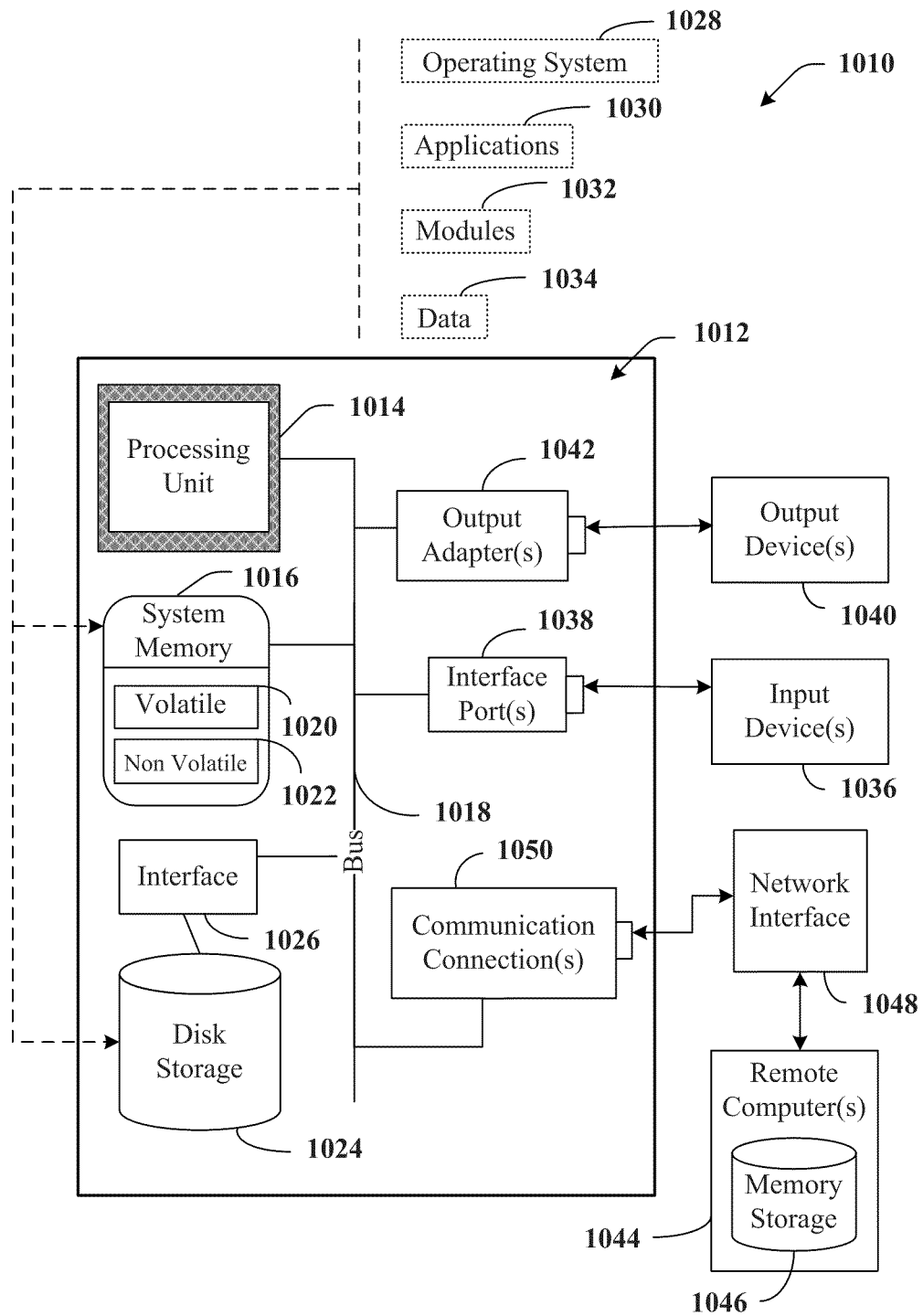
FIG. 10 is a block diagram illustrating an example operating environment in which the present invention may function.

In order to provide a context for the various aspects of the invention, FIGS. 10 *and* 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive), digital versatile disk ROM drive (DVD-ROM), DVD recordable drive (DVD-R), DVD rewritable drive (DVD-RW), and any other suitable DVD drives. To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN), wide-area networks (WAN), and wireless wide-area networks (WWAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL). WWAN technologies include, but are not limited to, transmission of radio signals over analog, digital cellular, or PCS networks, and can include signal transmission through microwaves and/or other electromagnetic waves.

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
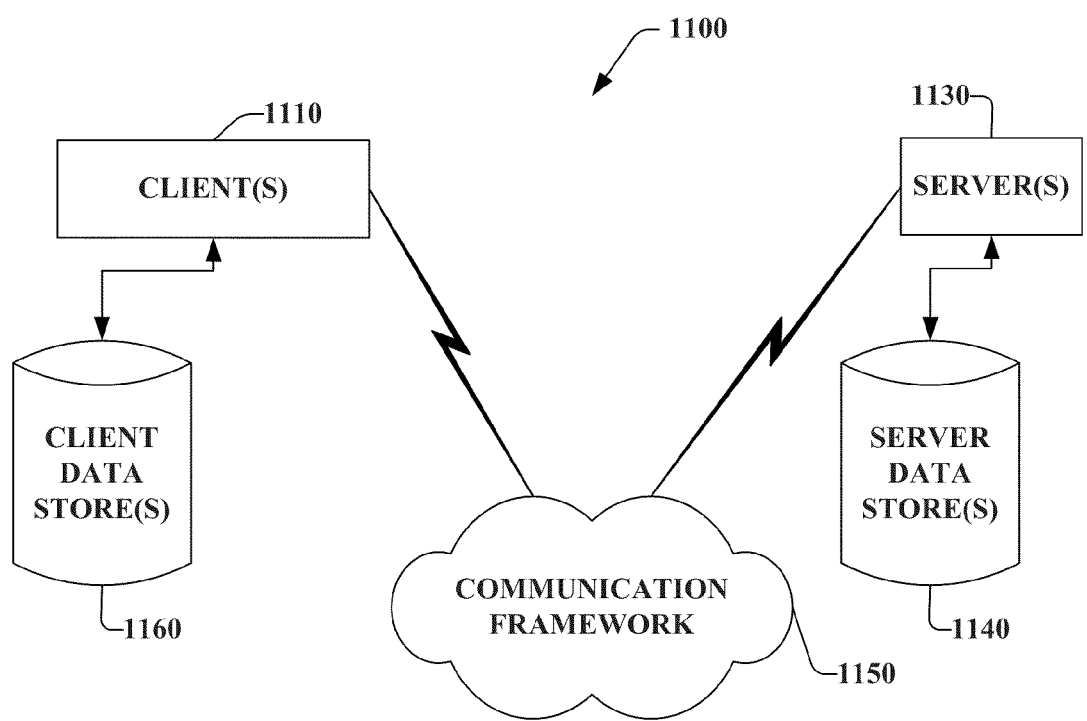
FIG. 11 is a schematic block diagram of a sample-computing environment with which the present invention can interact.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory configured to store computer-executable components; and
   a processor, communicatively coupled to the memory, configured to execute or facilitate execution of the computer-executable components, the computer-executable components comprising:
   an interface library configured to store visualization data comprising a first graphical object having a first number of dimensions that represents process point data received from an industrial automation system device, wherein the first graphical object is to be displayed via a first display screen of a first display device, and
   an interface generator configured to convert, based on capability data indicative of a capability of a second display device, the first graphical object to a second graphical object having a second number of dimensions that represents the process point data, wherein the capability data comprises resolution data indicative of a resolution of a second display screen of the second display device and the first number of dimensions is different from the second number of dimensions.

2. The system of claim 1, wherein the capability comprises at least one of a hardware processing capability, a display capability, a memory capacity, or an operating system supported by the second display device.

3. The system of claim 1, wherein the interface generator is further configured to determine a connection of the second display device to a network device of a communication network to which the system is coupled.

4. The system of claim 3, wherein the interface generator is further configured to determine format data received via a plug-and-play interface and utilize the format data to convert the first graphical object to the second graphical object.

5. The system of claim 3, wherein the interface generator is further configured to facilitate a transmission of the second graphical object to the second display device via the network device.

6. The system of claim 1, wherein the second display device comprises a mobile communication device.

7. The system of claim 1, wherein the second graphical object facilitates a control of at least a portion of the industrial automation device based on control data received via the second display device.

8. The system of claim 7, wherein the control data represents a manipulation of the second graphical object.

9. The system of claim 1, wherein the interface generator is further configured to modify the graphical object based on at least one of classification data indicative of a type of the process point data or access level data indicative of an access level associated with the second display device.

10. A method, comprising:
    determining, by a system comprising a processor, a graphical representation having a first number of dimensions that is indicative of process point data received from an industrial automation device of an industrial automation network, wherein the graphical representation determined based on first resolution data indicative of a first resolution of a first display screen of a first display device; and
    based on attribute data indicative of an attribute of a second display device, changing the first number of dimensions to a second number of dimensions, wherein the attribute data comprises second resolution data indicative of a second resolution of a second display screen of the second display device and the second number of dimensions does not match the first number of dimensions.

11. The method of claim 10, further comprising, subsequent to the changing, directing the graphical representation to a data store of the industrial automation network.

12. The method of claim 11, further comprising:
subsequent to storing the graphical representation within the data store, facilitating a transmission of graphical representation from the data store to a disparate device.

13. The method of claim 10, further comprising:
in response to determining that the second display device is connected to a communication network, facilitating a transmission of the graphical representation to the second display device via a communication link of the communication network.

14. A method, comprising:
receiving, by a system comprising a processor, industrial automation data associated with an industrial automation system; and
determining, for disparate display devices, disparate customized visualization data that graphically represent the industrial automation data as disparate graphical objects having different number of dimensions, wherein the determining comprises determining a number of dimensions of a graphical object of the disparate graphical objects based on resolution data indicative of a resolution of a display screen of a display device of the disparate display devices.

15. The method of claim 14, further comprising, storing the disparate customized visualization data in a shared data store associated with the industrial automation system.

16. The method of claim 14, further comprising:
determining a coupling of the display device to a set of network devices of a specified communication network; and
in response to the determining the coupling, determining attribute data indicative of an attribute associated with the display device by employing a plug-and-play mechanism, wherein the attribute data is employed to select the graphical object that is provided to the display device.

17. The method of claim 14, further comprising:
based on capability data indicative of a capability of the display device, selecting the graphical object of the disparate graphical objects; and
directing the graphical object to the display device.

18. The method of claim 17, wherein the selecting comprises selecting the graphical object based on information representing at least one of a hardware processing capability, a display capability, a memory capacity, or a software platform supported by the display device.

19. The method of claim 14, wherein the determining the number of dimensions comprises determining the number of dimensions based on memory data indicative of a capacity of a memory of the display device.

20. A non-transitory computer readable storage medium comprising computer-executable instructions that, in response to execution, cause a system, comprising a processor, to perform operations, comprising:
receiving industrial automation data;
determining, for disparate display devices, disparate customized visualization data that graphically represent the industrial automation data as disparate graphical objects having different number of dimensions, wherein the determining comprises determining a number of dimensions of a graphical object of the disparate graphical objects based on resolution data indicative of a resolution of a display screen of a display device of the disparate display devices.

21. The non-transitory computer readable storage medium of claim 20, wherein a first graphical object of the disparate graphical objects comprises a three-dimensional graphical object a second graphical object of the disparate graphical objects comprises a two-dimensional graphical object.

* * * * *